United States Patent
Li et al.

(10) Patent No.: US 11,097,853 B2
(45) Date of Patent: Aug. 24, 2021

(54) EDGE COMPUTING BASED AIRPLANE AUXILIARY POWER UNIT HEALTH MONITORING SYSTEM

(71) Applicant: HONEYWELL INTERNATIONAL INC., Morris Plains, NJ (US)

(72) Inventors: Qixiang Li, Beijing (CN); Timothy Griffith, Mesa, AZ (US); Sapan Nitin Shah, Bellerose, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 200 days.

(21) Appl. No.: 16/355,973

(22) Filed: Mar. 18, 2019

(65) Prior Publication Data

US 2020/0298995 A1    Sep. 24, 2020

(51) Int. Cl.
  *B64D 45/00* (2006.01)
  *H04L 29/08* (2006.01)
  *B64D 41/00* (2006.01)

(52) U.S. Cl.
  CPC ............ *B64D 45/00* (2013.01); *B64D 41/00* (2013.01); *H04L 67/12* (2013.01); *B64D 2045/0085* (2013.01)

(58) Field of Classification Search
  CPC ................ B64D 45/00; B64D 41/00; B64D 2045/0085; H04L 67/12; H04W 4/42; H04W 4/44
  See application file for complete search history.

(56) References Cited

U.S. PATENT DOCUMENTS

| 6,122,575 | A | 9/2000 | Schmidt et al. |
| 7,308,614 | B2 | 12/2007 | Kojori |
| 2015/0324501 | A1* | 11/2015 | Desell ............ G06F 30/20 |
| | | | 703/2 |

(Continued)

OTHER PUBLICATIONS

Letourneau, S. et al.; Improving Preciseness of Time to Failure Predictions: Application to APU starter; 2008 International Conference on Prognostics and Health.

(Continued)

*Primary Examiner* — Anne Marie Antonucci
(74) *Attorney, Agent, or Firm* — Lorenz & Kopf, LLP (57) ABSTRACT

A processor implemented method in an aircraft-mounted edge computing device configured for real-time monitoring and analysis of APU health information onboard an aircraft is provided. The method comprises: receiving raw APU data from an electronic control unit associated with an APU; downloading one or more tuning parameters from a cloud-based health monitoring system, wherein the one or more tuning parameters includes a threshold level that is adjustable by the cloud-based health monitoring system based on analyzed APU health information; analyzing the raw APU data using the one or more tuning parameters to capture elements of the raw APU data that indicate an APU health concern; reducing the amount of raw APU data in the captured elements by removing raw APU data indicating intermittent or false-positive APU health concerns; and transmitting the captured elements indicating an APU heath concern using an Internet of things protocol to the cloud-based health monitoring system.

20 Claims, 5 Drawing Sheets

(56) References Cited

U.S. PATENT DOCUMENTS

2016/0244179 A1 8/2016 Catt
2017/0291715 A1 10/2017 Jayathirtha et al.

OTHER PUBLICATIONS

Edwards, T. et al.; Internet of Things—A Complete Solution for Aviation's Predictive Maintenance; Springer International Publishing AG 2017.
Chen, X. et al.; APU feature integration based on multi-variant flight data analysis; Published in: 2016 IEEE International Conference on Prognostics and Health Management (ICPHM); Date of Conference: Jun. 20-22, 2016.

* cited by examiner

EDGE COMPUTING BASED AIRPLANE AUXILIARY POWER UNIT HEALTH MONITORING SYSTEM

TECHNICAL FIELD

The present invention generally relates to aircraft health monitoring systems, and more particularly relates to an aircraft auxiliary power unit health monitoring system.

BACKGROUND

The auxiliary power unit (APU) when installed on an airplane provides bleed air and electrical power during normal airplane operation before main engine start and after the main engines are shut down. To determine the health of the APU, APU health data and messages may be physically downloaded from an aircraft quick access recorder (QAR). Trained experts can then analyze the downloaded APU data to determine the health of the APU. To access the downloaded data, a maintenance technician or engineer must access the aircraft. Because the retrieval of APU health data can take significant time and resources, aircraft operators (e.g., airlines) will typically schedule this activity for when it is convenient. This manual method for obtaining APU health data is not real-time monitoring, is inconvenient to the operators, and often does not allow the aircraft operators to resolve APU maintenance actions in enough time to prevent flight delays and cancellations.

To check APU component health, a BITE (Build-In Test Equipment) test, additionally or alternatively, may be performed in the cockpit after each flight. Performing a BITE test does not result in real-time testing since BITE testing involves checking APU component health after a fault event has occurred. BITE testing may require engineering, planning and line maintenance resources, can be a complicated process, and can disrupt aircraft service schedules.

Hence, it is desirable to provide a system and method for real-time monitoring of APU health data. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An aircraft-mounted edge computing device configured for real-time monitoring and analysis of APU health information onboard an aircraft is disclosed. The edge computing device includes one or more processors configured by programming instructions on non-transient computer readable media. The edge computing device is configured to: receive raw APU data from an electronic control unit associated with an APU; download one or more tuning parameters from a cloud-based health monitoring system, wherein the one or more tuning parameters include a threshold level that is adjustable by the cloud-based health monitoring system based on analyzed APU health information; apply an algorithm that analyzes the raw APU data using the one or more tuning parameters to capture elements of the raw APU data that indicate an APU health concern, wherein the algorithm is configured to reduce the amount of raw APU data in the captured elements by removing raw APU data indicating intermittent or false-positive APU health concerns; and transmit the captured elements indicating an APU heath concern using an Internet of things (IOT) protocol to the cloud-based health monitoring system.

A processor-implemented method in an aircraft-mounted edge computing device configured for real-time monitoring and analysis of APU health information onboard an aircraft is disclosed. The method includes: receiving raw APU data from an electronic control unit associated with an APU; downloading one or more tuning parameters from a cloud-based health monitoring system, wherein the one or more tuning parameters include a threshold level that is adjustable by the cloud-based health monitoring system based on analyzed APU health information; analyzing the raw APU data using the one or more tuning parameters to capture elements of the raw APU data that indicate an APU health concern; reducing the amount of raw APU data in the captured elements by removing raw APU data indicating intermittent or false-positive APU health concerns; and transmitting the captured elements indicating an APU heath concern using an Internet of things (IOT) protocol to the cloud-based health monitoring system.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

An auxiliary power unit (APU), when installed on an aircraft, can provide bleed air and electrical power to the aircraft during the normal operation before main engine start and after the main engines are shut down. The APU's associated electronic control unit (ECU) provides two health monitoring data sources, dump data bus and BITE data bus, on ARINC 429. These data sources provide significant information regarding the health of the APU.

The health monitoring data sources provide a data stream that contains raw indication bits as binary (On/Off) signals for multiple APU system incidents when an interruption or disruption is detected. These indications do not necessarily indicate impending performance issues but can be used for APU fault diagnostics and maintenance recommendations. The subject matter described herein discloses apparatus, systems, techniques and articles for improving the accuracy of the indications with regard to forecasting APU health from the raw indications in the ECU data stream. The apparatus, systems, techniques and articles provided herein utilize an edge node on an airplane to process the data from either the dump data bus or BITE data bus in real time. Preliminary computing can be performed by the edge node to identify APU core or LRU health alerts.

The apparatus, systems, techniques and articles provided herein can allow a summary report identifying only the APU systems of concern to be downlinked directly from the edge node or through an airplane data communication system such as ACARS (Aircraft Communications Addressing and Reporting System). The apparatus, systems, techniques and articles provided herein, through downloading of a summary report to a cloud-based system, can provide real-time APU health monitoring functionality. The apparatus, systems, techniques and articles provided herein by summarizing the health alerts can provide a reduced-size downlink file that can reduce the transmission cost for a data link to transmit the downlink file from the airplane to the cloud-based maintenance system.

Figure 1:
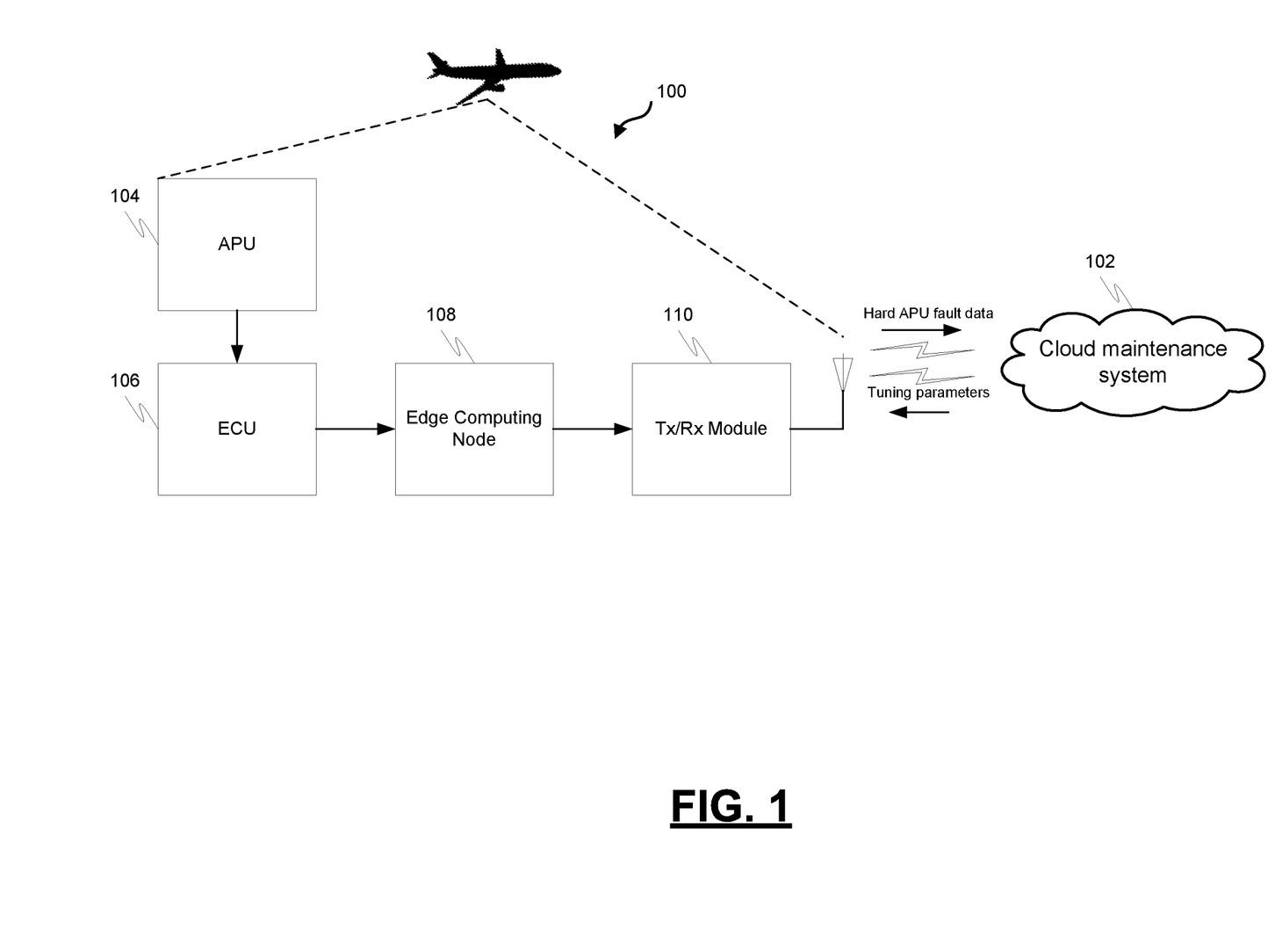
FIG. 1 is a block diagram depicting an example aircraft system for providing real-time APU health data to a cloud-based maintenance system, in accordance with some embodiments.

FIG. 1 is a block diagram depicting an example aircraft system 100 for providing real-time APU health data to a cloud-based maintenance system 102. The example aircraft system 100 includes an APU 104, the APU's associated ECU 106, an edge computing device 108, and a data communication system 110. The example ECU 106 receives data from the APU 104 regarding the health of the APU 104 and provides health data to the edge computing device 108. The example edge computing device 108 is configured to analyze the health data from the ECU 106 using one or more tuning parameters, capture the portion of the health data that indicates a hard fault while excluding health data indicating false or intermittent faults, and transmit the hard fault data to the cloud-based maintenance system 102 via the data communication system 110. In addition to providing further analysis of the transmitted hard fault data, the example cloud-based maintenance system 102 is configured to compute and transmit the one or more tuning parameters for use by the example edge computing device 108 when analyzing the ECU provided health data.

Figure 2:
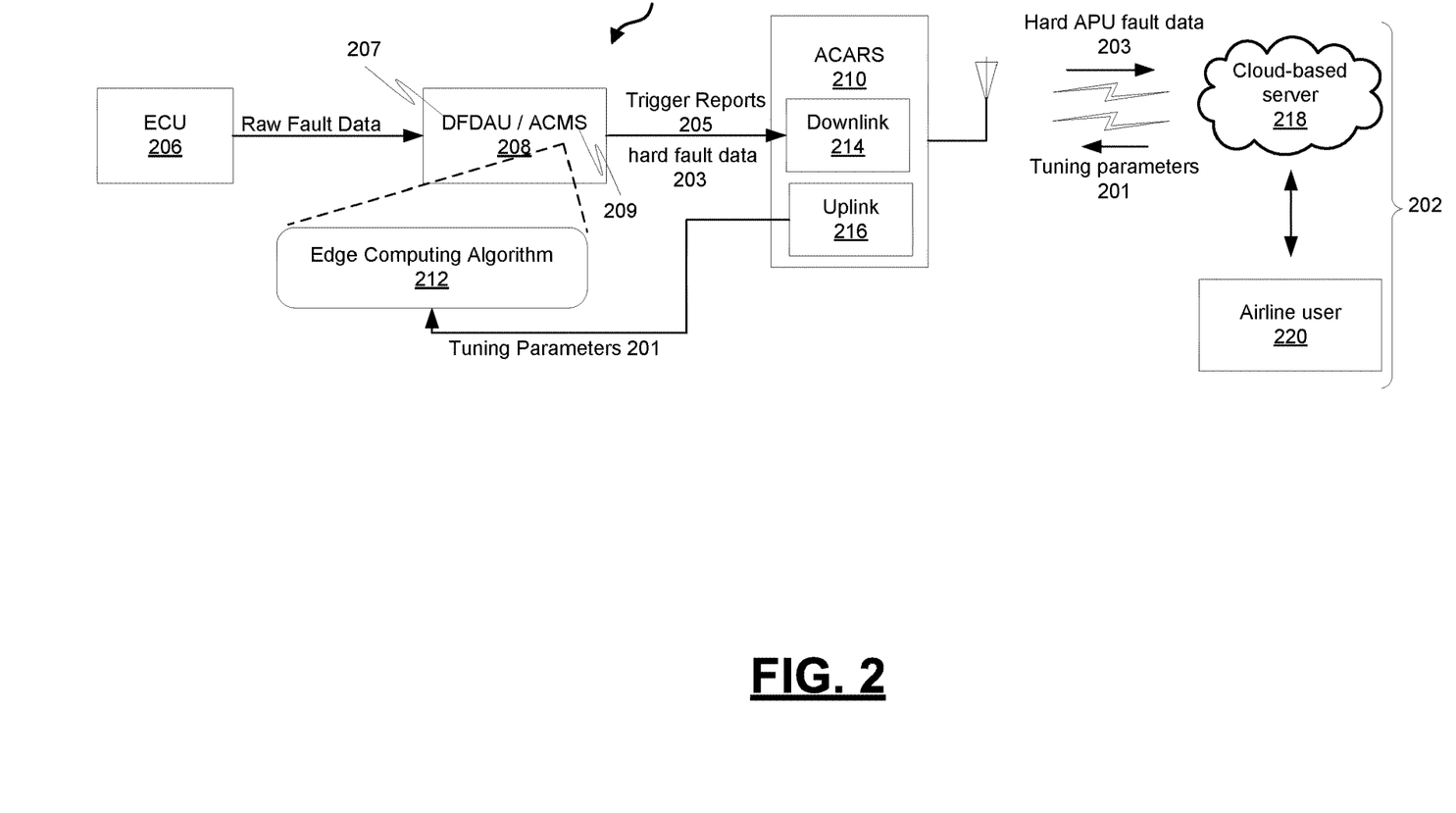
FIG. 2 is a block diagram depicting an example aircraft system for providing real-time APU health data to a cloud-based maintenance system, in accordance with some embodiments.

FIG. 2 is a block diagram depicting an example aircraft system 200 that is configured to provide real-time APU health data to a cloud-based maintenance system 202. The example aircraft system 200 includes an ECU 206 that is associated with an APU (not shown), an edge computing device or node 208, and a data communication system 210, which is the interface between the aircraft and ground systems (e.g., cloud maintenance system 202). The example ECU 206 collects APU data and provides the APU health data to the edge computing device 208.

The edge computing node 208 may be a dedicated unit which is installed on the aircraft. The edge node 208 is configured to process raw APU data, identify APU health issues and transmit the information to an airplane condition monitoring system (ACMS) or directly to a cloud-based health monitoring system.

In this example, the edge computing device or node 208 is configured in the ACMS 209 of a digital flight data acquisition unit (DFDAU) 207 and is configured by an edge computing algorithm 212 to perform computations to identify hard APU fault data. The example ACMS 208 is configured to execute the edge computing algorithm 212 to analyze the health data from the ECU 206 using one or more tuning parameters 201, capture the portion of the health data that indicates a hard fault while excluding health data indicating false or intermittent faults, and transmit the hard fault data 203 to the cloud-based maintenance system 202 via the data communication system 210.

In an example operating sequence, the ECU 206 collects the APU's data and sends APU raw data to the DFDAU 207. The ACMS 209 reads the data that has been digitized by DFDAU 207 and looks for any exceedance. If an exceedance has been detected, the ACMS 209 will send a downlink command to the ACARS 210, which contains the exceedance report 205 for the ground system 202.

The edge node 208 which is hosted in the ACMS 209, in this example, receives the tuning parameters 201 from the cloud service host 202 to fine tune algorithm criteria on a real-time basis based on either statistically analysis or a machine learning result performed by the cloud service 202 to increase the accuracy of the algorithm 212. For example, in the algorithm 212, a tuning parameter may be a threshold.

The value of this tuning parameter is updated by the analytic result from the cloud service 202.

In this example, the ACMS 209 also has embedded software 212 that allow the ACMS 209 to perform edge computational analysis. In the example implementation, the APU health monitoring performed as an edge node of the ACMS can be partitioned into a 'secondary' ACMS database. The ACMS can still maintain its 'primary' ACMS database which can continue to function as a trigger for exceedance reports.

The example data communication system 210 comprises an aircraft communications addressing and reporting system (ACARS). The example ACARS includes a downlink system 214 (e.g., transmitter) that can be used to transmit the hard APU fault data to the cloud-based maintenance system 202, and an uplink system 216 (e.g., receiver) that can be used to receive the one or more tuning parameters 201 from the cloud-based maintenance system 202. The example data communication system 210 is configured to transmit the hard APU fault data 203 using an Internet of things (IOT) protocol to the cloud-based health monitoring system 202.

In this example, the cloud-based maintenance system 202 comprises a cloud-based server 218 and an airline system 220. In addition to providing further analysis of the transmitted hard fault data 203, the example cloud-based maintenance system 202 is configured to compute and transmit the one or more tuning parameters 201 for use by the example edge computing device 208 when analyzing the ECU provided health data. The one or more tuning parameters 201 may be computed by the cloud-based server 218, the airline system 220, or both.

Figure 3:
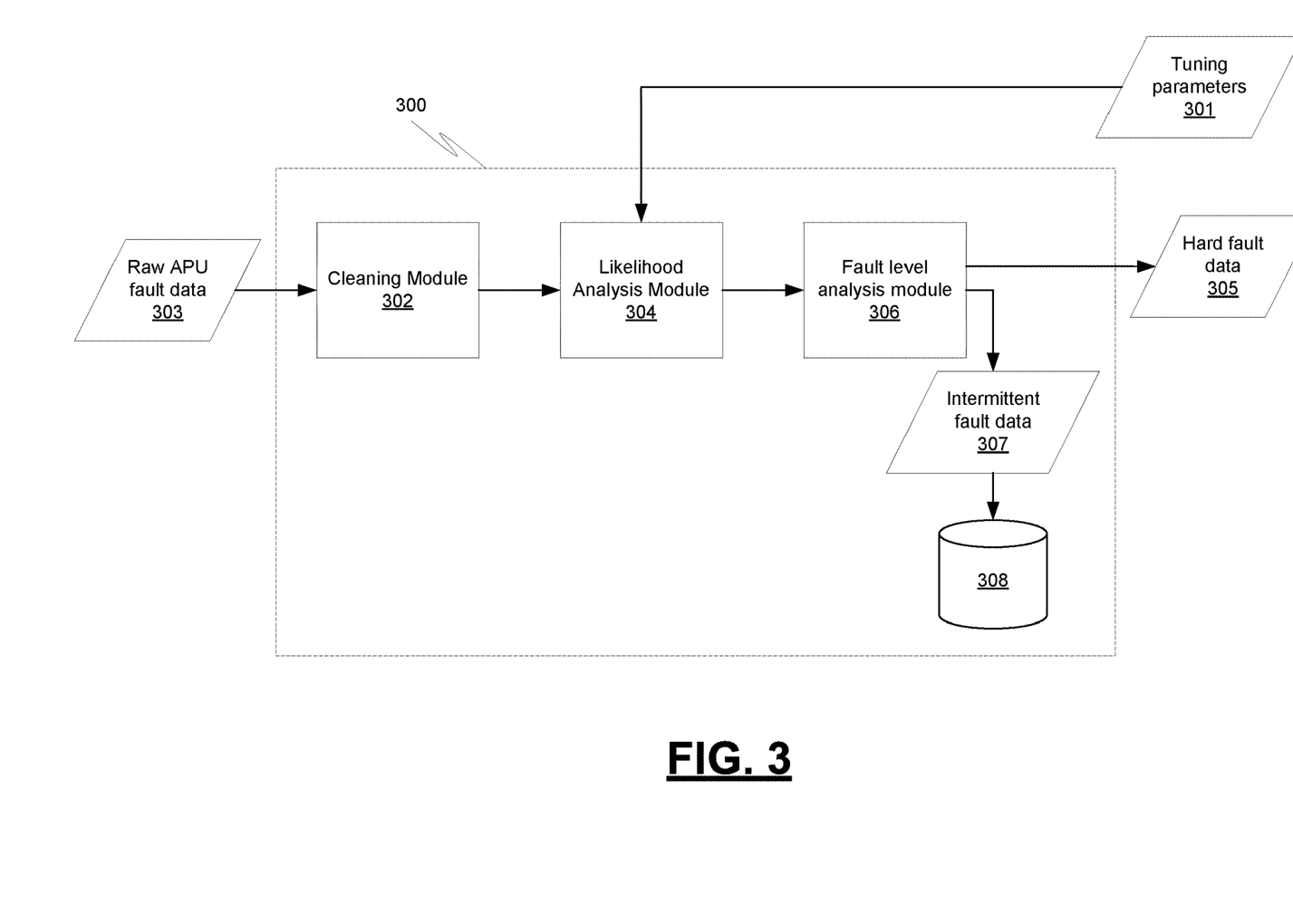
FIG. 3 is a block diagram depicting example components of an example edge computing device, in accordance with some embodiments.

FIG. 3 is a block diagram depicting example components of an example edge computing device 300. The example edge computing device 300 is configured to execute an edge computing algorithm to analyze, using one or more tuning parameters 301, APU health data 303 received from an ECU associated with an APU, capture the portion of the APU health data that indicates hard faults while excluding health data indicating false or intermittent faults 307, and transmit the APU hard fault data 305 to a cloud-based maintenance system.

The example edge computing device 300 includes a data cleaning module 302, a likelihood analysis module 304, a fault level analysis module 306, and non-transient storage area 308. The edge computing device 300 includes a controller that is configured to implement the data cleaning module 302, likelihood analysis module 304, and fault level analysis module 306. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example edge computing device 300 is configured to receive raw APU data 303 from the ECU associated with the APU, download one or more tuning parameters 301 from a cloud-based health monitoring system wherein the one or more tuning parameters 301 include a threshold level that is adjustable by the cloud-based health monitoring system based on analyzed APU health information, and transmit the captured elements 305 indicating an APU heath concern using an Internet of things (IOT) protocol to the cloud-based health monitoring system.

The example data cleaning module 302 is configured to perform data cleansing operations prior to using the one or more tuning parameters 301 to capture elements of the raw APU data that indicate an APU health concern. Data cleansing or data cleaning, in this example, involves detecting and correcting (or removing) corrupt or inaccurate data from the raw APU fault data 303 and may include identifying incomplete, incorrect, inaccurate or irrelevant parts of the data and then replacing, modifying, or deleting the dirty or coarse data.

The example likelihood analysis module 304 together with the example fault level analysis module 306 are configured to apply an algorithm that analyzes, in real-time, the raw APU data 303, after data cleansing, using the one or more tuning parameters 301 to capture elements of the raw APU data 303 that indicate a true APU health concern. In particular, the algorithm is configured to reduce the amount of raw APU data in the captured elements by removing, in real-time, raw APU data indicating a false positive for an APU health concern and separating, in real-time, APU data indicating intermittent APU health concerns from APU data indicating hard APU health concerns.

Specifically, the example likelihood analysis module 304 is configured to apply a likelihood function (e.g., L (of X) to represent the characteristic vector of the fault signal) to the APU data, after data cleansing, to remove false positives in real time. The example likelihood analysis module 304 is also configured to store the APU data, with false positives removed, in a buffer.

The example fault level analysis module 306 is configured to apply a clustering technique, in real-time, to the APU data stored in the buffer to distinguish true APU health concerns from intermittent APU health concerns. The clustering technique may involve the use of a support vector machine to cluster APU data indicating true APU health concerns from APU data indicating intermittent APU health concerns. The clustering technique may also involve the use of a stop timer to end the application of the clustering technique after a pre-determined time period has elapsed and identifying APU data with the highest likelihood of indicating a true APU health concern if the clustering has not separated a true APU health concern from intermittent APU health concerns. The example fault level analysis module 306 is further configured to store the APU data indicating intermittent APU health concerns in the example non-transient storage area 308 for later access and analysis, while forwarding the APU data indicating a hard fault for transmission to a cloud-based maintenance system, for example using an IOT protocol.

Figure 4:
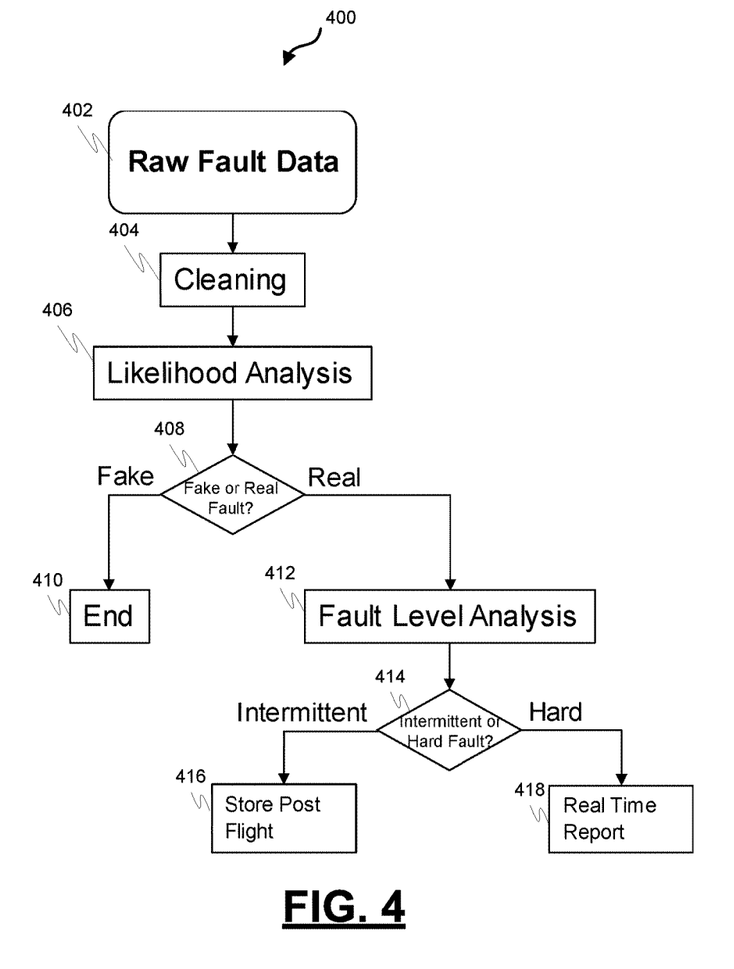
FIG. 4 is a process flow chart depicting an example process in an aircraft-mounted edge computing device configured for real-time monitoring and analysis of APU health information onboard an aircraft, in accordance with some embodiments.

FIG. 4 is a process flow chart depicting an example process 400 in an aircraft-mounted edge computing device configured for real-time monitoring and analysis of APU health information onboard an aircraft. The example process 400 includes receiving raw APU data from an electronic control unit associated with an APU (operation 402). Next, the example process 400 includes cleaning the raw APU data (operation 404). Then, the example process 400 includes performing a likelihood analysis on the cleaned APU data to eliminate false positives (operation 406).

Next, the example process 400 includes determining from the likelihood analysis whether certain parts of the data indicate a false fault or a real fault (decision 408). If the likelihood analysis indicates a false fault, then the example process 400 includes removing the false fault data from the cleaned APU data (operation 410). If the likelihood analysis indicates a real fault, then the example process 400 includes performing fault level analysis on the real fault data (operation 412) to separate intermittent faults from hard faults.

The fault level analysis (operation 412) may involve performing clustering operations to separate intermittent faults from hard faults. The clustering operations may include the training and use of a support vector machine (SVM) to perform clustering operations. The example process 400 includes determining if the fault level analysis indicates an intermittent fault or hard fault (decision 414). If the fault level analysis indicates an intermittent fault, then the example process 400 involves storing the intermittent fault data for post flight analysis (operation 416). If the fault level analysis indicates a hard fault, then the example process 400 involves reporting the fault data in real time (operation 418) to the cloud-based maintenance system.

Figure 5:
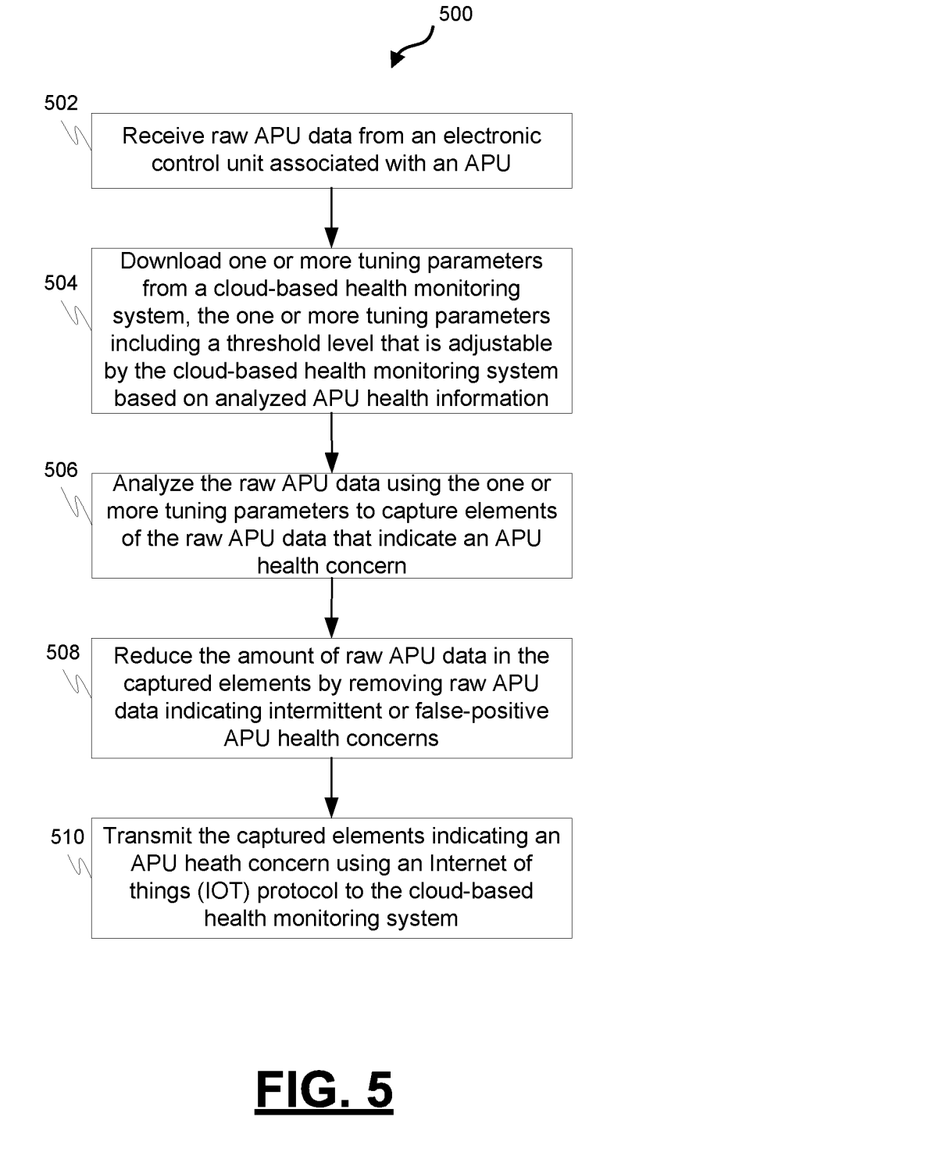
FIG. 5 is a process flow chart depicting an example processor-implemented process in an aircraft-mounted edge computing device configured for real-time monitoring and analysis of APU health information onboard an aircraft, in accordance with some embodiments.

FIG. 5 is a process flow chart depicting an example processor-implemented process 500 in an aircraft-mounted edge computing device configured for real-time monitoring and analysis of APU health information onboard an aircraft. The order of operation within the process 500 is not limited to the sequential execution as illustrated in the figure, but may be performed in one or more varying orders as applicable and in accordance with the present disclosure.

The example process 500 includes receiving raw APU data from an electronic control unit associated with an APU (operation 502). The example process 500 includes downloading one or more tuning parameters from a cloud-based health monitoring system, wherein the one or more tuning parameters include a threshold level that is adjustable by the cloud-based health monitoring system based on analyzed APU health information (operation 504). The example process 500 includes analyzing the raw APU data using the one or more tuning parameters to capture elements of the raw APU data that indicate an APU health concern (operation 506). Data cleansing may be performed prior to analyzing the raw APU data.

The example process 500 includes reducing the amount of raw APU data in the captured elements by removing raw APU data indicating intermittent or false-positive APU health concerns (operation 508). The reducing may include applying a likelihood function to the APU data to eliminate false positives. The reducing may include applying a clustering technique to the APU data to distinguish hard APU health concerns from intermittent APU health concerns. The clustering technique may involve applying a support vector machine to distinguish hard APU health concerns from intermittent APU health concerns. The clustering technique may involve applying a stop timer to end the application of the clustering technique after a pre-determined time period has elapsed and identifying APU data with the highest likelihood of indicating a hard APU health concern if the clustering has not separated a hard APU health concern from intermittent APU health concerns.

The example process 500 includes transmitting the captured elements indicating an APU heath concern using an Internet of things (IOT) protocol to the cloud-based health monitoring system (operation 510).

Described herein are apparatus, systems, techniques and articles that may monitor Auxiliary Power Unit (APU) mechanical and performance issues on an airplane platform based on edge computing and internet of things technology. The apparatus, systems, techniques and articles can provide APU fault detection algorithms that analyze and only capture elements that indicate a potential APU health concern while minimizing the capture and conveyance of nuisance faults or messages. The differentiation in data downlink size (cost) and the time to capture and evaluate the data can be significant using the apparatus, systems, techniques and articles described herein.

In one embodiment, an aircraft-mounted edge computing device configured for real-time monitoring and analysis of APU health information onboard an aircraft is provided. The edge computing device comprises one or more processors configured by programming instructions on non-transient computer readable media. The edge computing device is configured to: receive raw APU data from an electronic control unit associated with an APU; download one or more tuning parameters from a cloud-based health monitoring system, wherein the one or more tuning parameters include a threshold level that is adjustable by the cloud-based health monitoring system based on analyzed APU health information; apply an algorithm that analyzes the raw APU data using the one or more tuning parameters to capture elements of the raw APU data that indicate an APU health concern, wherein the algorithm is configured to reduce the amount of raw APU data in the captured elements by removing raw APU data indicating intermittent or false-positive APU health concerns; and transmit the captured elements indicating an APU heath concern using an Internet of things (IOT) protocol to the cloud-based health monitoring system.

In one embodiment, the algorithm is configured to apply a likelihood function to the APU data to eliminate false positives.

In one embodiment, the algorithm is configured to store the APU data that with false positives eliminated in a buffer.

In one embodiment, the algorithm is configured to apply a clustering technique to the APU data stored in the buffer to distinguish true APU health concerns from intermittent APU health concerns.

In one embodiment, the clustering technique comprises the use of a support vector machine to cluster APU data indicating true APU health concerns from APU data indicating intermittent APU health concerns.

In one embodiment, the clustering technique comprises the use of a stop timer to end the application of the clustering technique after a pre-determined time period has elapsed and identifying APU data with the highest likelihood of indicating a true APU health concern if the clustering has not separated a true APU health concern from intermittent APU health concerns.

In one embodiment, the edge computing device is configured in a digital flight data acquisition unit with an integrated airplane condition monitoring system.

In one embodiment, the edge computing device is further configured to perform data cleansing prior to using the one or more tuning parameters to capture elements of the raw APU data that indicate an APU health concern.

In another embodiment, a processor implemented method in an aircraft-mounted edge computing device configured for real-time monitoring and analysis of APU health information onboard an aircraft is provided. The method comprises: receiving raw APU data from an electronic control unit associated with an APU; downloading one or more tuning parameters from a cloud-based health monitoring system, wherein the one or more tuning parameters include a threshold level that is adjustable by the cloud-based health monitoring system based on analyzed APU health information; analyzing the raw APU data using the one or more tuning parameters to capture elements of the raw APU data that indicate an APU health concern; reducing the amount of raw APU data in the captured elements by removing raw APU data indicating intermittent or false-positive APU health concerns; and transmitting the captured elements indicating an APU heath concern using an Internet of things (IOT) protocol to the cloud-based health monitoring system.

In one embodiment, the method further comprises applying a likelihood function to the APU data to eliminate false positives.

In one embodiment, the method further comprises storing the APU data with false positives eliminated in a buffer.

In one embodiment, the method further comprises applying a clustering technique to the APU data stored in the buffer to distinguish true APU health concerns from intermittent APU health concerns.

In one embodiment, the clustering technique comprises applying a support vector machine to distinguish true APU health concerns from intermittent APU health concerns.

In one embodiment, the clustering technique comprises applying a stop timer to end the application of the clustering technique after a pre-determined time period has elapsed and identifying APU data with the highest likelihood of indicating a true APU health concern if the clustering has not separated a true APU health concern from intermittent APU health concerns.

In one embodiment, the method is performed in a digital flight data acquisition unit with an integrated airplane condition monitoring system.

In one embodiment, the method further comprises performing data cleansing prior to analyzing the raw APU data.

In another embodiment, provided in non-transient computer readable media encoded with programming instructions configured to cause one or more processors in an aircraft-mounted edge computing device to perform a method of real-time monitoring and analysis of APU health information onboard an aircraft. The method comprises: receiving raw APU data from an electronic control unit associated with an APU; downloading one or more tuning parameters from a cloud-based health monitoring system, wherein the one or more tuning parameters include a threshold level that is adjustable by the cloud-based health monitoring system based on analyzed APU health information; analyzing the raw APU data using the one or more tuning parameters to capture elements of the raw APU data that indicate an APU health concern; reducing the amount of raw APU data in the captured elements by removing raw APU data indicating intermittent or false-positive APU health concerns; and transmitting the captured elements indicating an APU heath concern using an Internet of things (IOT) protocol to the cloud-based health monitoring system.

In one embodiment, the method further comprises applying a likelihood function to the APU data to eliminate false positives.

In one embodiment, the method further comprises storing the APU data that with false positives eliminated in a buffer.

In one embodiment, the method further comprises applying a clustering technique to the APU data stored in the buffer to distinguish true APU health concerns from intermittent APU health concerns.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft-mounted edge computing device configured for real-time monitoring and analysis of APU health information onboard an aircraft, the edge computing device comprising one or more processors configured by programming instructions on non-transitory computer readable media, the edge computing device configured to:
   receive raw APU data from an electronic control unit associated with an APU;
   download one or more tuning parameters from a cloud-based health monitoring system, the one or more tuning parameters including a threshold level that is adjustable by the cloud-based health monitoring system based on analyzed APU health information;
   apply an algorithm that analyzes the raw APU data using the one or more tuning parameters to capture elements of the raw APU data that indicate an APU health concern, the algorithm configured to reduce the amount of raw APU data in the captured elements by removing raw APU data indicating intermittent or false-positive APU health concerns; and
   transmit the captured elements indicating an APU heath concern using an Internet of things (IOT) protocol to the cloud-based health monitoring system.

2. The edge computing device of claim 1, wherein the algorithm is configured to apply a likelihood function to the raw APU data to eliminate the raw APU data indicating false-positive APU health concerns.

3. The edge computing device of claim 2, wherein the algorithm is configured to store the raw APU data in a buffer without the raw APU data indicating false-positive APU health concerns.

4. The edge computing device of claim 3, wherein the algorithm is configured to apply a clustering technique to the raw APU data stored in the buffer to distinguish raw APU data indicating true APU health concerns from the raw APU data indicating intermittent APU health concerns.

5. The edge computing device of claim 4, wherein the clustering technique comprises the use of a support vector machine to cluster raw APU data to distinguish raw APU data indicating true APU health concerns from the raw APU data indicating intermittent APU health concerns.

6. The edge computing device of claim 4, wherein the clustering technique comprises the use of a stop timer to end the application of the clustering technique after a pre-determined time period has elapsed and identifying raw APU data with the highest likelihood of indicating a true APU health concern if the clustering has not separated raw APU data indicating a true APU health concern from the raw APU data indicating intermittent APU health concerns.

7. The edge computing device of claim 1, wherein the edge computing device is configured in a digital flight data acquisition unit with an integrated airplane condition monitoring system.

8. The edge computing device of claim 1, further configured to perform data cleansing prior to using the one or more tuning parameters to capture the elements of the raw APU data that indicate the APU health concern.

9. A processor implemented method in an aircraft-mounted edge computing device configured for real-time monitoring and analysis of APU health information onboard an aircraft, the method comprising:
   receiving raw APU data from an electronic control unit associated with an APU;
   downloading one or more tuning parameters from a cloud-based health monitoring system, the one or more tuning parameters including a threshold level that is adjustable by the cloud-based health monitoring system based on analyzed APU health information;
   analyzing the raw APU data using the one or more tuning parameters to capture elements of the raw APU data that indicate an APU health concern;
   reducing the amount of raw APU data in the captured elements by removing raw APU data indicating intermittent or false-positive APU health concerns; and
   transmitting the captured elements indicating an APU heath concern using an Internet of things (IOT) protocol to the cloud-based health monitoring system.

10. The method of claim 9, further comprising applying a likelihood function to the raw APU data to eliminate the raw APU data indicating false-positive APU health concerns.

11. The method of claim 10, further comprising storing the raw APU data in a buffer without the raw APU data indicating false-positive APU health concerns.

12. The method of claim 11, further comprising applying a clustering technique to the raw APU data stored in the buffer to distinguish raw APU data indicating true APU health concerns from the raw APU data indicating intermittent APU health concerns.

13. The method of claim 12, wherein the clustering technique comprises applying a support vector machine to distinguish raw APU data indicating true APU health concerns from the raw APU data indicating intermittent APU health concerns.

14. The method of claim 12, wherein the clustering technique comprises applying a stop timer to end the application of the clustering technique after a pre-determined time period has elapsed and identifying raw APU data with the highest likelihood of indicating a true APU health concern if the clustering has not separated raw APU data indicating a true APU health concern from the raw APU data indicating intermittent APU health concerns.

15. The method of claim 9, wherein the method is performed in a digital flight data acquisition unit with an integrated airplane condition monitoring system.

16. The method of claim 9, further comprising performing data cleansing prior to analyzing the raw APU data.

17. Non-transitory computer readable media encoded with programming instructions configured to cause one or more processor in an aircraft-mounted edge computing device to perform a method of real-time monitoring and analysis of APU health information onboard an aircraft, the method comprising:
   receiving raw APU data from an electronic control unit associated with an APU;
   downloading one or more tuning parameters from a cloud-based health monitoring system, the one or more tuning parameters including a threshold level that is adjustable by the cloud-based health monitoring system based on analyzed APU health information;
   analyzing the raw APU data using the one or more tuning parameters to capture elements of the raw APU data that indicate an APU health concern;
   reducing the amount of raw APU data in the captured elements by removing raw APU data indicating intermittent or false-positive APU health concerns; and
   transmitting the captured elements indicating an APU heath concern using an Internet of things (IOT) protocol to the cloud-based health monitoring system.

18. The non-transitory computer readable media of claim 17, wherein the method further comprises applying a likelihood function to the raw APU data to eliminate the raw APU data indicating false-positive APU health concerns.

19. The non-transitory computer readable media of claim 18, wherein the method further comprises storing the raw APU data in a buffer without the raw APU data indicating false-positive APU health concerns.

20. The non-transitory computer readable media of claim 19, wherein the method further comprises applying a clustering technique to the raw APU data stored in the buffer to distinguish raw APU data indicating true APU health concerns from the raw APU data indicating intermittent APU health concerns.

\* \* \* \* \*